(12) United States Patent
Bulthuis et al.

(10) Patent No.: US 11,822,123 B2
(45) Date of Patent: Nov. 21, 2023

(54) PLC SILICA TO SILICON NITRIDE MODE TRANSFORMER FOR HYBRID DEVICES

(71) Applicants: BROADEX TECHNOLOGIES CO., LTD., Zhejiang (CN); BROADEX TECHNOLOGIES UK LIMITED, Lothian (GB)

(72) Inventors: Hindrik Bulthuis, Zhejiang (CN); Duncan P. Nicol, Zhejiang (CN)

(73) Assignees: BROADEX TECHNOLOGIES CO., LTD., Zhejiang (CN); BROADEX TECHNOLOGIES UK LIMITED, Lothian (GB)

(*) Notice: Subject to any disclaimer, the term of this patent is extended or adjusted under 35 U.S.C. 154(b) by 0 days.

(21) Appl. No.: 17/058,001

(22) PCT Filed: May 31, 2019

(86) PCT No.: PCT/CN2019/089424
§ 371 (c)(1),
(2) Date: Nov. 23, 2020

(87) PCT Pub. No.: WO2019/228486
PCT Pub. Date: Dec. 5, 2019

(65) Prior Publication Data
US 2021/0271026 A1 Sep. 2, 2021

Related U.S. Application Data

(60) Provisional application No. 62/678,907, filed on May 31, 2018.

(51) Int. Cl.
*G02B 6/26* (2006.01)
*G02B 6/122* (2006.01)
(Continued)

(52) U.S. Cl.
CPC ....... *G02B 6/1228* (2013.01); *G02B 6/12002* (2013.01); *G02B 6/12004* (2013.01);
(Continued)

(58) Field of Classification Search
CPC .......... G02B 6/262; G02B 6/1228; G02B 2006/12147; G02B 2006/12019;
(Continued)

(56) References Cited

U.S. PATENT DOCUMENTS

| | | | |
|---|---|---|---|
| 2004/0037497 A1* | 2/2004 | Lee | G02B 6/132 385/28 |
| 2008/0044126 A1 | 2/2008 | Costa | |
| 2017/0139132 A1* | 5/2017 | Patel | G02B 6/4206 |

FOREIGN PATENT DOCUMENTS

| | | |
|---|---|---|
| CN | 101641622 A | 2/2010 |
| CN | 203241564 U | 10/2013 |

(Continued)

*Primary Examiner* — Michael P Mooney
(74) *Attorney, Agent, or Firm* — Muncy, Geissler, Olds & Lowe (57) ABSTRACT

Roughly described, an optical device includes a first waveguide having a first core sheathed by a first cladding, and a second waveguide having a second core. A terminal portion of second core is disposed under a terminal portion of the first core and sheathed by the first core. The refractive index of the second core is higher than that of the first core, and the index of the first core, at least in the terminal portion of the first waveguide, is higher than that of the first cladding. The second core is structured under the terminal portion of the first core so that light traveling in the second core and directed toward the end of the second core is guided along the second core and coupled into the first core, and vice-versa.

18 Claims, 11 Drawing Sheets

(51) Int. Cl.
*G02B 6/12* (2006.01)
*G02B 6/30* (2006.01)

(52) U.S. Cl.
CPC .......... *G02B 6/262* (2013.01); *G02B 6/12019* (2013.01); *G02B 6/305* (2013.01)

(58) Field of Classification Search
CPC ............ G02B 6/12019; G02B 6/12002; G02B 6/12004; G02B 6/305
See application file for complete search history.

(56) References Cited

FOREIGN PATENT DOCUMENTS

| | | | | |
|---|---|---|---|---|
| CN | 104101952 A | | 10/2014 | |
| CN | 104570235 A | | 4/2015 | |
| CN | 107765364 A | * | 3/2018 | ........... G02B 6/1228 |
| CN | 107765364 A | | 3/2018 | |

* cited by examiner

PLC SILICA TO SILICON NITRIDE MODE TRANSFORMER FOR HYBRID DEVICES

BACKGROUND

This invention relates to low loss methods for interfacing silica-based optical devices with silicon-nitride-based optical devices so that each technology can be used to its best advantage in a hybrid device.

DESCRIPTION OF RELATED ART

The footprint of devices and optical chips needs to get smaller to make them cheaper, use less energy, dissipate less heat, reduce material waste, and reduce cost. This means that existing technologies like PLC using silica need to be developed to make the die smaller. This is usually accomplished by increasing the core/cladding index contrast. However, increasing the material contrast typically leads to drawbacks such as increasing propagation losses. An alternative approach has been to explore new materials such as Silicon Photonics, or Indium Phosphide or Silicon Nitride or Silicon Oxy-Nitride among many others. Each material base has its own trade-offs. For example silica is cheap, easy to manufacture, and can be permanently tuned but the die are relatively large; whereas structures made from compounds of silicon and nitride are typically much smaller, support tight bend radii, but cannot be permanently tuned. Silicon Nitride structures also have other drawbacks, like poor coupling to single mode fiber due to mode mismatch, polarization dependence of the waveguide index and polarization dependence of the mode field. Another drawback of Silicon Nitride structures is higher temperature dependence of the refractive index (2.5e-5 for Si3N4 vs 0.95e-5 for SiO2).

Another approach is to create hybrid chips, where one part of the chip is made using one material e.g., silica, which is permanently tunable, and another part of the chip is made using a second material, e.g., a compound of silicon nitride, which is not permanently tunable. The hybrid material configurations, however, have been difficult to use in the past because it has been difficult to couple light efficiently from one technology platform e.g. silica to the other, e.g., the compound of silicon nitride.

In the description herein, a solution is provided that enables low loss optical coupling between silica and silicon nitride based portions of a hybrid device, thereby making the hybrid configurations much more feasible.

SUMMARY

An opportunity therefore arises to create robust solutions to the problem of large integrated optical devices. Better chip yields, and denser, and more powerful optical devices, components and systems may result.

Roughly described, the invention involves an optical coupling device which includes a first (e.g. silica) optical waveguide having a first core of a first core material sheathed by a first cladding and having a longitudinally terminal portion terminating at an end of the first waveguide, and a second (e.g. nitride or silicon oxy-nitride) optical waveguide having a second core of a second core material, the second optical waveguide having a longitudinally terminal portion of second core and terminating at an end of the second core. The longitudinally terminal portion of second core is disposed under the longitudinally terminal portion of the first core and sheathed by the first core. The index of refraction of the waveguide mode of the second core is higher than index of the waveguide mode of the first core, and the first core has an index of refraction of the waveguide mode, at least in the terminal portion of the first waveguide, which is higher than that of the first cladding. Furthermore, the second core is structured under the longitudinally terminal portion of the first core so that light traveling in the second core and directed toward the end of the second core is guided along the second core and coupled into the first core, and vice-versa.

In the device, the second waveguide can include a second longitudinal portion longitudinally adjacent to the end of the first waveguide, the second longitudinal portion of the second waveguide being sheathed by a second cladding having an index of refraction which is less than that of the second core.

The device can be integrated onto a substrate.

In the device, the terminal portion of the second core can be made to taper from the end of the first waveguide toward the end of the second core. The taper can be adiabatic.

In the device, the terminal portion of the second core can have an effective index of refraction which decreases monotonically from the end of the first waveguide toward the end of the second core.

In the device, the terminal portion of the second core can be at least partially segmented longitudinally, the segmentation being such as to decrease the effective index of refraction of the second core monotonically from the end of the first waveguide toward the end of the second core. Each segment of the second core material can be spaced from the next segment of the second core material by a longitudinal gap of a gap material having an index of refraction lower than that of the second core material. The gap material can be the first core material, for example, or it can comprise a mixture of the first core material and the first cladding material, as another example.

In a one embodiment, the segments decrease in length monotonically from the end of the first waveguide toward the end of the second core. In another embodiment, the gaps can increase in length monotonically from the end of the first waveguide toward the end of the second core. In yet another embodiment, the segments decrease in length monotonically from the end of the first waveguide toward the end of the second core and the gaps can increase in length monotonically from the end of the first waveguide toward the end of the second core.

In an embodiment, the second waveguide has a minimum bend radius which is less than the minimum bend radius of the first waveguide. Preferably the minimum bend radius of the second waveguide is no more than 100 microns, whereas the minimum bend radius of the first waveguide is at least 1 mm.

A device according to the invention can be arranged so that the first waveguide is coupled to transfer optical energy into or from an optical fiber. Alternatively or additionally, the second waveguide can be arranged to couple optical energy into or from an active optical device.

Furthermore, an optical device is provided which includes an arrayed waveguide grating (AWG having an input port and a plurality of output ports. The AWG is preferably made in silica technology. The device also includes a first silica optical waveguide and a plurality of second silica optical waveguides. A first nitride optical waveguide is arranged to guide optical energy from the first silica waveguide to the input port of the AWG, and a plurality of second nitride optical waveguides each guiding optical energy from a respective one of the AWG output ports to a corresponding one of the second silica optical waveguides. By using silica input and output waveguides, each of these are more easily coupled to optical fibers than are nitride waveguides. But by using nitride waveguides to couple light from the silica input optical waveguide to the input port of the AWG, and from the output ports of the AWG to the respective output optical fibers, the resulting chip can be made much smaller since the bends made in the nitride waveguides can be much tighter than if silica waveguides were used exclusively. For example the input nitride waveguide may have a minimum bend radius which is no greater than 100 microns, and/or one or more of the output nitride waveguides may have a minimum bend radius which is no greater than 100 microns.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 10 is a plot of normalized power transfer from the silica waveguide to the nitride waveguide for a structure like that shown in FIG. 9, for various values of a.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Implementations of the invention are described herein with respect to particular applications, and it will be appreciated that the invention can be used in many other applications and environments as well.

One limitation of integrated silicon nitride based structures is that typically they experience high optical losses when coupling light to or from a silica fiber and are more temperature and polarization sensitive. Silica-based integrated structures, on the other hand, can be designed to support optical modes that are very well matched to the fiber mode, e.g. SMF28 (single mode fiber 28. There are current techniques to couple light from the fiber to Si3N4, including grating couplers, prism couplers, and butt coupling. However, these techniques typically incur high optical coupling losses, and waste more energy. Thus, having a feasible hybrid silica/silicon nitride based chip would enable low loss coupling of optical energy from a silica fiber to an integrated silicon nitride based waveguide. In particular, the fiber is coupled first to an integrated silica waveguide, and the low loss silica/silicon nitride techniques herein are used to then couple light from the silica waveguide to the silicon nitride based waveguide. On leaving the chip, light couples from the silicon nitride based waveguide to the silica waveguide and then to the fiber. This is one application of the low loss coupling techniques described herein, and there are many other applications as well. The invention is not limited to this one application.

As used herein, the term "nitride" refers to any suitable compound of silicon, oxygen and nitrogen. The ratio of nitrogen to oxygen preferably is high enough to yield an index that is at least 5% higher than SiO2. Si3N4 is used in some of the described embodiments, but other specific compounds may be used in other embodiments.

Figure 1:
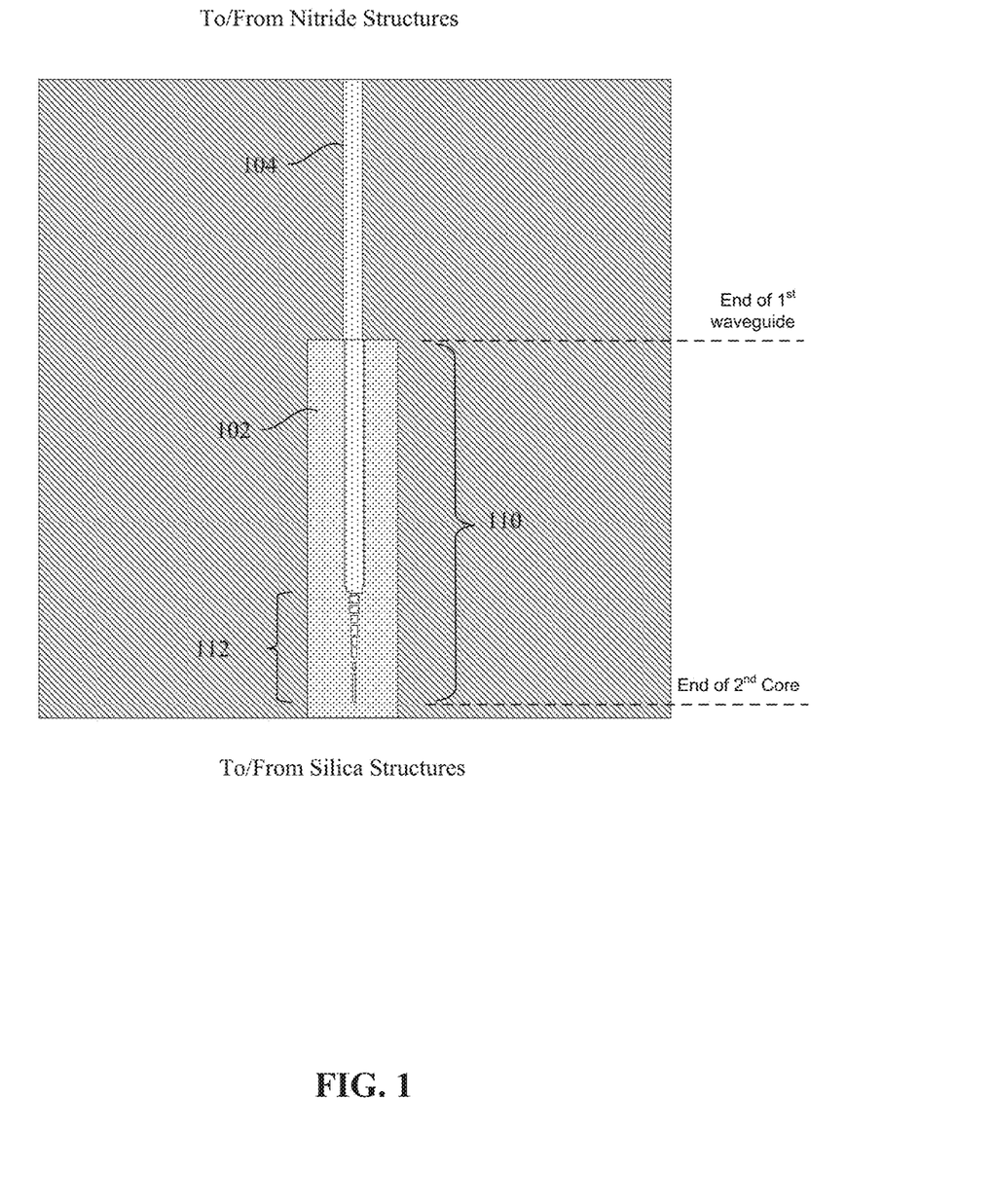
FIG. 1 illustrates a top view of a silica/nitride transition structure incorporating features of the invention.
Figure 2:
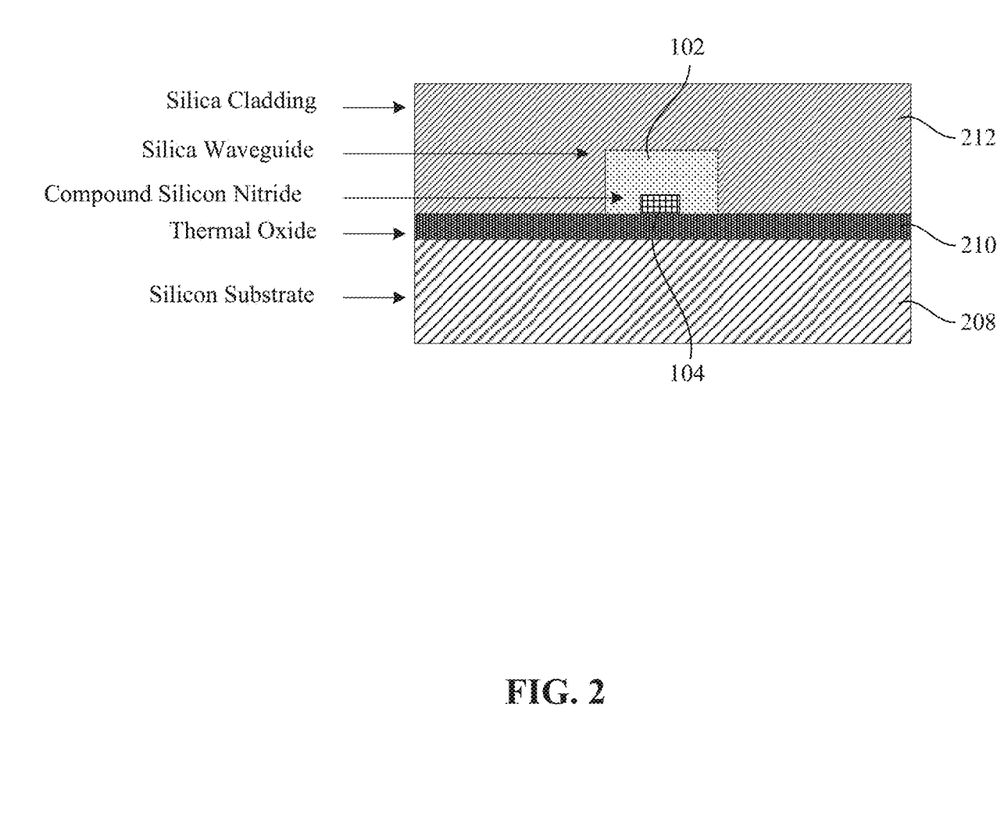
FIG. 2 is a cross-sectional view of the structure of FIG. 1.

FIG. 1 illustrates a top view of a silica/nitride transition structure. It includes a first waveguide 102 made of silica, and a second waveguide 104 made of nitride, formed on a silicon substrate with a silica top layer. Note that in all embodiments herein, the substrate could be another material; it does not have to be silicon with a silica top layer. The silica waveguide continues on to silica structures (such as an AWG, or a coupling to single mode silica fiber, and the nitride waveguide continues on to nitride structures (such as tight bends and/or active optical devices, such as Silicon Photonics, or an Indium Phosphide laser diode, or a gain chip. FIG. 2 is a cross-sectional view of the structure taken in the region where the two waveguides overlap. As illustrated in FIG. 2, the transition structure includes a thermal oxide layer 210 formed on a silicon substrate 208. In this region the nitride core material is formed on the thermal oxide layer 210, and silica core 102 surrounds the nitride core 104 on three sides. Silica cladding material 212 surrounds the silica core material on three sides. Thus in the overlap region, the thermal oxide and the silica core material act as cladding for the nitride waveguide 104, and the thermal oxide and the silica cladding material act as cladding for the silica waveguide 102. As used herein, the nitride core material is said to be "sheathed" by the silica core material, which is in turn said to be "sheathed" by the silica cladding material.

Returning to FIG. 1, the transition structure has an overlap portion 110 in which a terminal portion of the nitride waveguide core 104 continues under a terminal portion of the core of the silica waveguide 102. The core of the nitride waveguide 104 has an index of refraction which is higher than its cladding, and the core of the silica waveguide 102 has an index of refraction which is higher than that of its cladding. In addition, the index of the core of the nitride waveguide 104 is higher than the index of the core of the silica waveguide 102, thereby allowing the terminal portion of the core of the nitride waveguide 104 to continue guiding light for at least a short distance under the core of the silica waveguide 102. Evanescent coupling of the light from one waveguide to the other occurs as light travels in the overlapping section of the waveguides.

If the structure of the overlap portion is not designed well, however, there might be a large mismatch in the optical mode between the silica and nitride waveguides. Thus preferably, the core of the nitride waveguide 104 under the silica waveguide 102 is designed so as to gradually modify the guided optical mode from that of the external nitride waveguide 104 toward that of the silica waveguide 102. In particular, as can be seen in FIG. 1, a segmented taper 112 is used to interface between the two mentioned waveguides. A segmented taper enables lower loss when transferring the optical energy between the two waveguide types. The segmentation is a period segmentation of nitride core material under the silica core 102. The nitride layer is very thin and is deposited and etched before the silica. Since the refractive index of the nitride is much larger than the refractive indices of the silica core and silica cladding, the silica core acts as a background (clad material for the nitride waveguide in the overlap portion 110.

The structure of FIG. 1 uses two techniques for modifying the mode along the length of the overlap portion 110. First, the nitride core material narrows monotonically from the end of the silica waveguide toward the end of the overlap portion (downward in FIG. 1. Second, the nitride core material is segmented in the manner described herein. In one embodiment only the first of these techniques is used; there is no segmentation. In particular, the gradually narrowing nitride core material yields an adiabatic lossless transition. However, the narrowing technique would require the tip to be extremely narrow, so narrow that it is difficult to achieve with conventional photolithography technology. The problem is alleviated by also using the second technique, in which the nitride core material is longitudinally segmented in the overlap portion so as to monotonically reduce the effective index of refraction of the nitride core material (downward in FIG. 1 to a level where its contrast with the silica core material is insufficient to guide the nitride mode and instead power will transfer adiabatically to the waveguide mode in the silica core which has sufficient index contrast to support the fundamental mode. In some embodiments of the invention, only one of these techniques or the other is used for modifying the mode, but use of both in combination is preferred.

Each segment of nitride core material is spaced from the next segment of nitride core material by a longitudinal gap of a gap material that has an index that is lower than that of the nitride core material. In one embodiment, the gap material is silica core material, whereas in another embodiment the gap material is a mix of silica core and cladding material. Either the segments shorten, or the gaps lengthen, or preferably both, as the nitride core reaches deeper into the silica waveguide. In some embodiments the segments can lengthen while the gaps lengthen, or the segments can shorten while the gaps shorten, so long as the combined effect of the variations, together with any narrowing of the nitride waveguide, is to reduce the effective index of refraction of the nitride core monotonically within the overlap region from the end of the silica waveguide t ward the end (tip of the nitride waveguide. As used herein, a "monotonically" increasing relationship need not necessarily increase constantly; it is sufficient if it varies, and does so non-decreasingly, and ends up with a higher value than where it started. Similarly, a "monotonically" decreasing relationship need not necessarily decrease constantly; it is sufficient if it varies, and does so non-increasingly, and ends up with a lower value than where it started.

The segmentation and tapering have many embodiments of duty cycle, width, and length that allow for the optimized coupling of light from the silica waveguide to the nitride waveguide and vice-versa. Beginning at the upper end of the segmented portion 112 of the taper 110, and proceeding downward in FIG. 1, waveguide segments with width equal to the critical dimension decrease in length while the gaps between segments simultaneously also increase in length. By increasing volume of cladding material in between segments, the effective index of the core waveguide is gradually reduced beyond the limit for a continuous waveguide.

Figure 9:
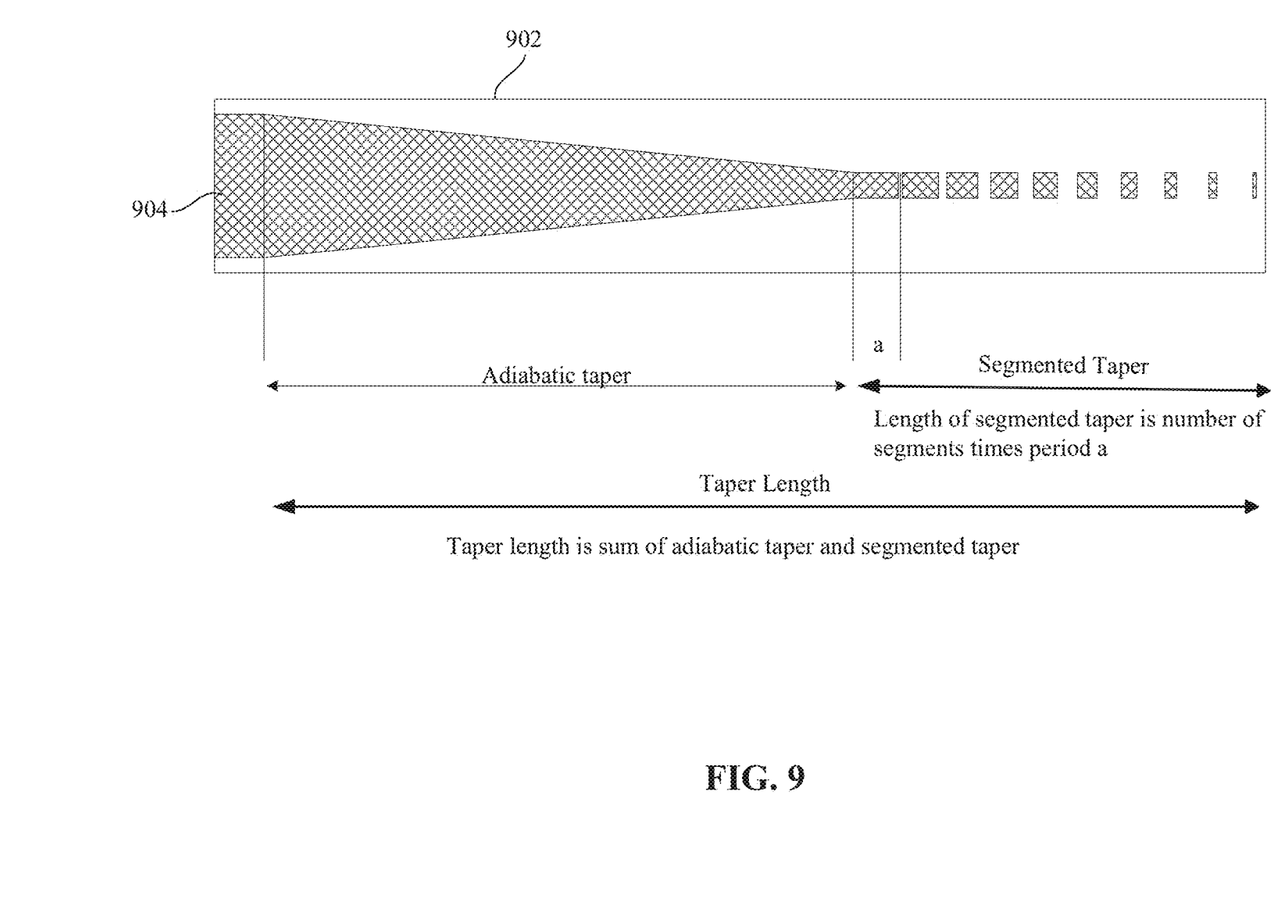
FIG. 9 is a top view of a coupling structure using a segmented taper according to aspects of the invention.

Another embodiment is shown in FIG. 9, where the nitride waveguide material is identified as 904 and the silica waveguide material is identified as 902. In this embodiment, for light traveling from left-to-right, light confined in the nitride is first tapered adiabatically from a 4 um wide waveguide to down to 0.7 um wide waveguide, thus eventually increasing the optical mode size. Subsequently a periodically segmented waveguide of width 0.7 um has in every period an incrementally reduced length of nitride material increasing the optical mode even further, enhancing coupling to the silica doped core on top. The segmented taper is designed as follows: a 0.7 μm wide waveguide has a roughly constant longitudinal period a, and increasing lengths of gaps between high index segments, thereby causing further effective reduction of the contrast. If the largest segment has length a, then 10 segments decrease in length in steps of 0.1a from a to 0.1a, while 9 gaps increase in length in steps of 0.1a from 0.1a to 0.9a; thus the segmented taper length is 10a in FIG. 9.

Figure 10:
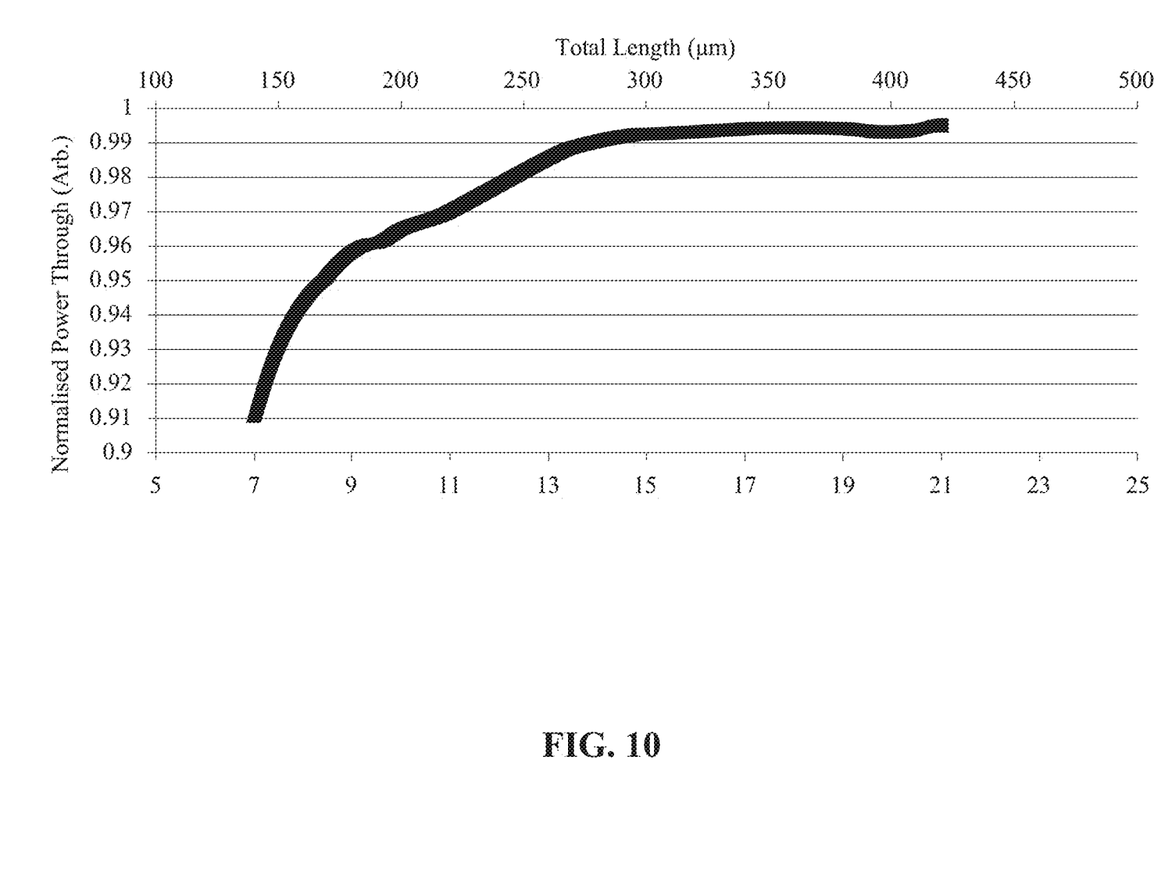

FIG. 10 indicates the amount of power that can be transferred from the silica waveguide to the nitride waveguide for a structure like that shown in FIG. 9, for various values of a. It can be seen that better than 99% power can be transferred when the period a is larger than about 14 um. The total length of the segmented taper in that case is 140 um. In FIG. 10 the adiabatic taper is taken to be the same length as the segmented taper, but this is an arbitrary choice, and the non-segmented adiabatic taper may be shorter or longer depending on various parameters, like acceptable loss etc.

There is a tradeoff in the design of the taper: a longer taper is better for mode matching, but as the nitride taper is made longer, the propagation loss increases since the propagation loss in nitride is higher than its counterpart in silica. Also for some designs it is necessary to minimize the length to satisfy externally imposed footprint constraints.

Figure 3A:
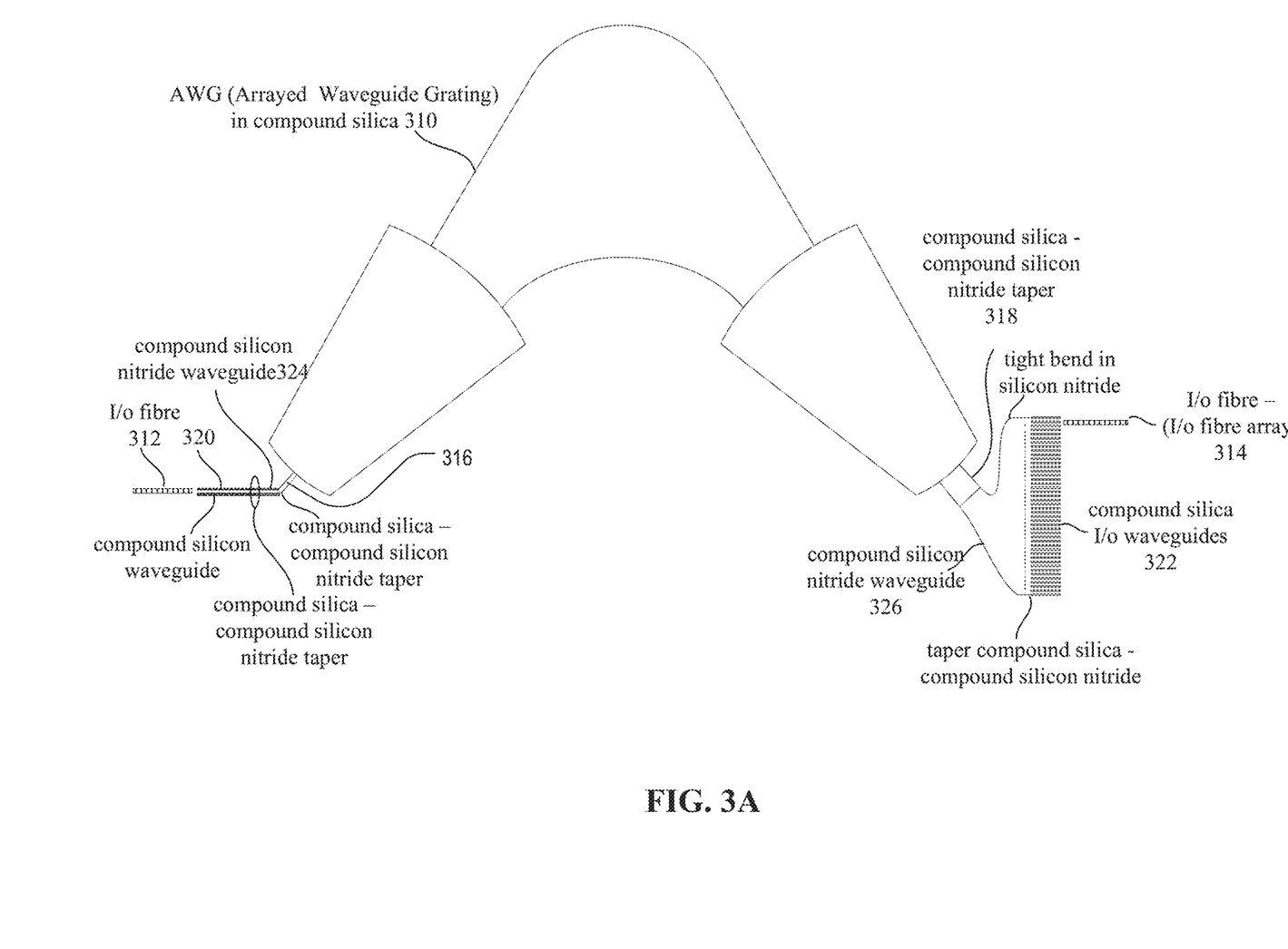
FIG. 3A illustrates an example application of aspects of the subject technology.

FIG. 3A illustrates one example application of the hybrid technology described herein, where each technology platform is used to its strengths. FIG. 3A shows an AWG 310 made in silica, interfacing to silica fiber 312, 314 at both ends through nitride segments. Silica waveguides are used to interface between the fiber and the chip, as this gives low optical coupling loss. Silica waveguides interface with nitride waveguides to transfer the light into the nitride waveguides, because for single mode optical transmission, nitride waveguides can make bends with radii smaller than about 100 microns whereas it is impractical to build silica waveguides with bend radii below the millimeter range. Nitride waveguides are used to route the optics across the chip, which helps reduce the footprint on the chip. Nitride waveguides interface back to silica waveguides for technology specific operations, e.g. AWGs (as the silica AWGs can be permanently tuned, while nitride AWGs currently cannot be permanently tuned, among other differences mentioned elsewhere herein. Silica waveguides interface back to nitride waveguides for further optical routing across the chip, including tight waveguide bends (tighter than the minimum radius of bends in silica. Then nitride waveguides interface back to silica waveguides to allow for low loss optical coupling between the chip and the fiber.

Thus it can be seen in FIG. 3A the device includes an arrayed waveguide grating (AWG 310 which has an input port 316 and a plurality of output ports 318. Though not necessarily distinguishable in the drawing, the output ports 318 are individual optical fibers. The AWG is preferably made in a silica technology platform, as are each of the input and output ports 316 and 318. The device also includes an input silica optical waveguide 320 and a plurality of output silica optical waveguides 322. An input nitride optical waveguide 324 is arranged to guide optical energy from the input silica waveguide 320 to the input port 316 of the AWG, and a plurality of output nitride optical waveguides 326 each guide optical energy from a respective one of the AWG output ports 318 to a corresponding one of the output silica optical waveguides 322. By using silica input and output waveguides, each of these are more easily coupled to optical fibers (312 and 314 for example than are nitride waveguides. But by using nitride waveguides (324 and 326, for example to route light from the silica input optical waveguide 320 to the input port 316 of the AWG, and from the output ports 318 of the AWG to the respective output optical fibers 322, the resulting chip can be made much smaller since the bends made in the nitride waveguides can be much tighter than if silica waveguides were used exclusively. For example the input nitride waveguide may have a minimum bend radius which is no greater than 100 microns, and/or one or more of the output nitride waveguides may have a minimum bend radius which is no greater than 100 microns. (As explained elsewhere herein, reference to "inputs" and "outputs" do not imply that the device operates in only one direction; the device also operates in reverse, in which case the "outputs" become inputs and the "inputs" become outputs.

Figure 3B:
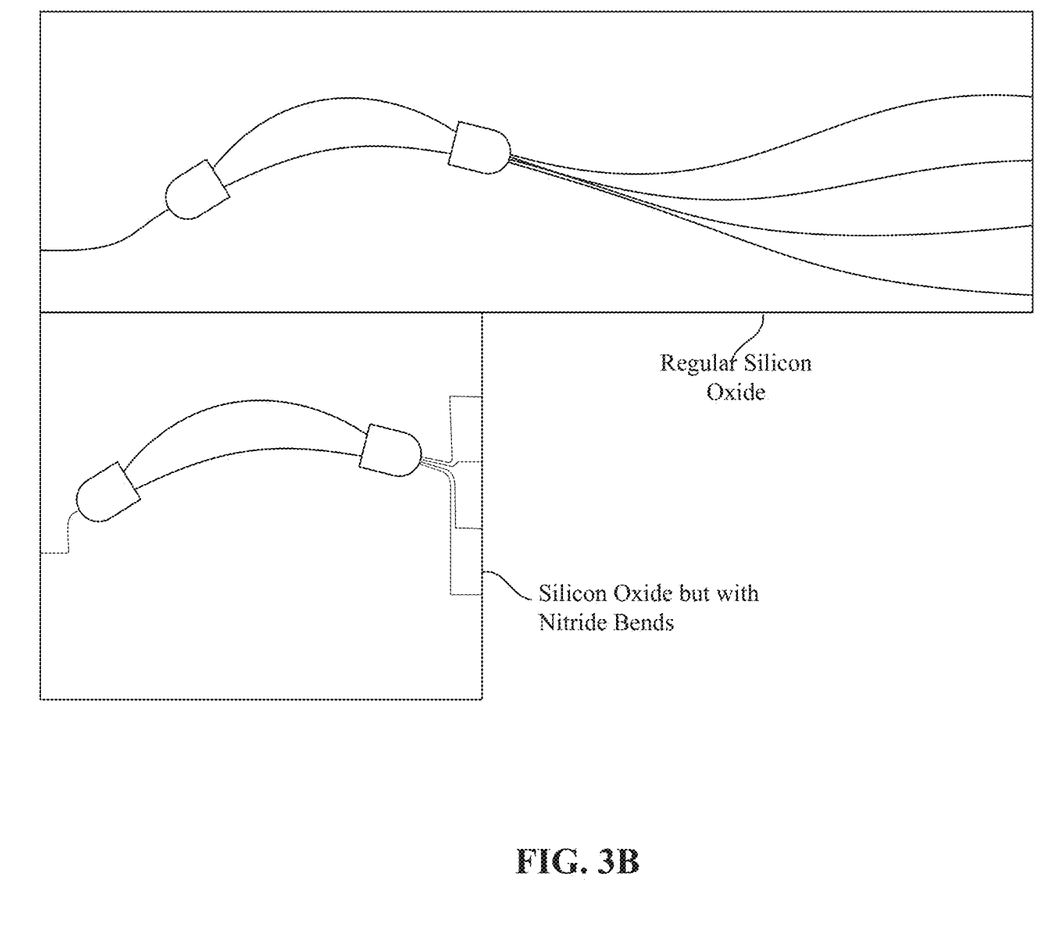
FIG. 3B is a size comparison illustrating how much the footprint of an AWG device can be reduced using aspects of the invention.

FIG. 3B is a size comparison illustrating how much the footprint of an AWG device can be reduced merely by using nitride waveguide segments for tight radius waveguide bends, and using tapers such as that of FIGS. 1 and 2 in transitions between silica waveguides and the nitride waveguides. Further, it will be appreciated that in other embodiments, nitride segments can be present on only one end of the AWG and not the other, and in still other embodiments other optical functions can be included in the light path, with or without transitions to and from waveguides of the two technology platforms.

Figure 4:
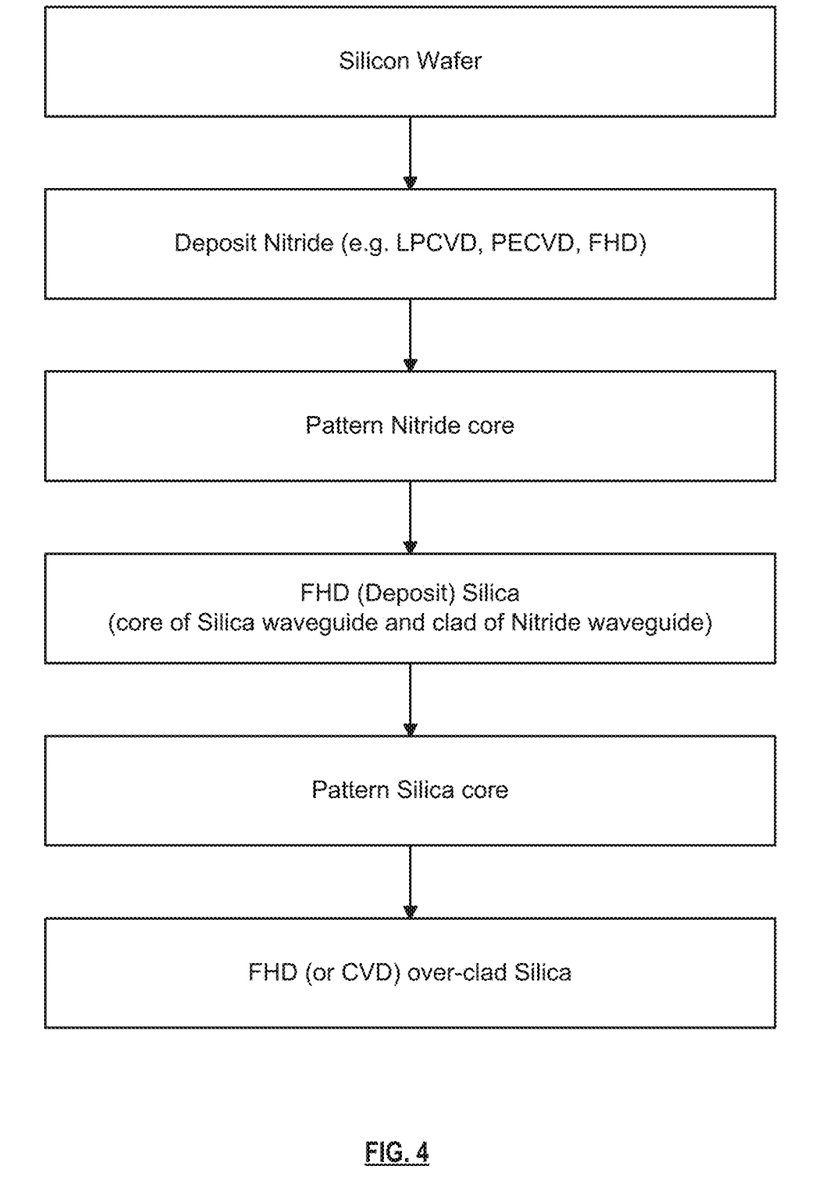
FIG. 4 illustrates major steps of one embodiment of a process for fabricating a device using aspects of the invention.
Figure 5:
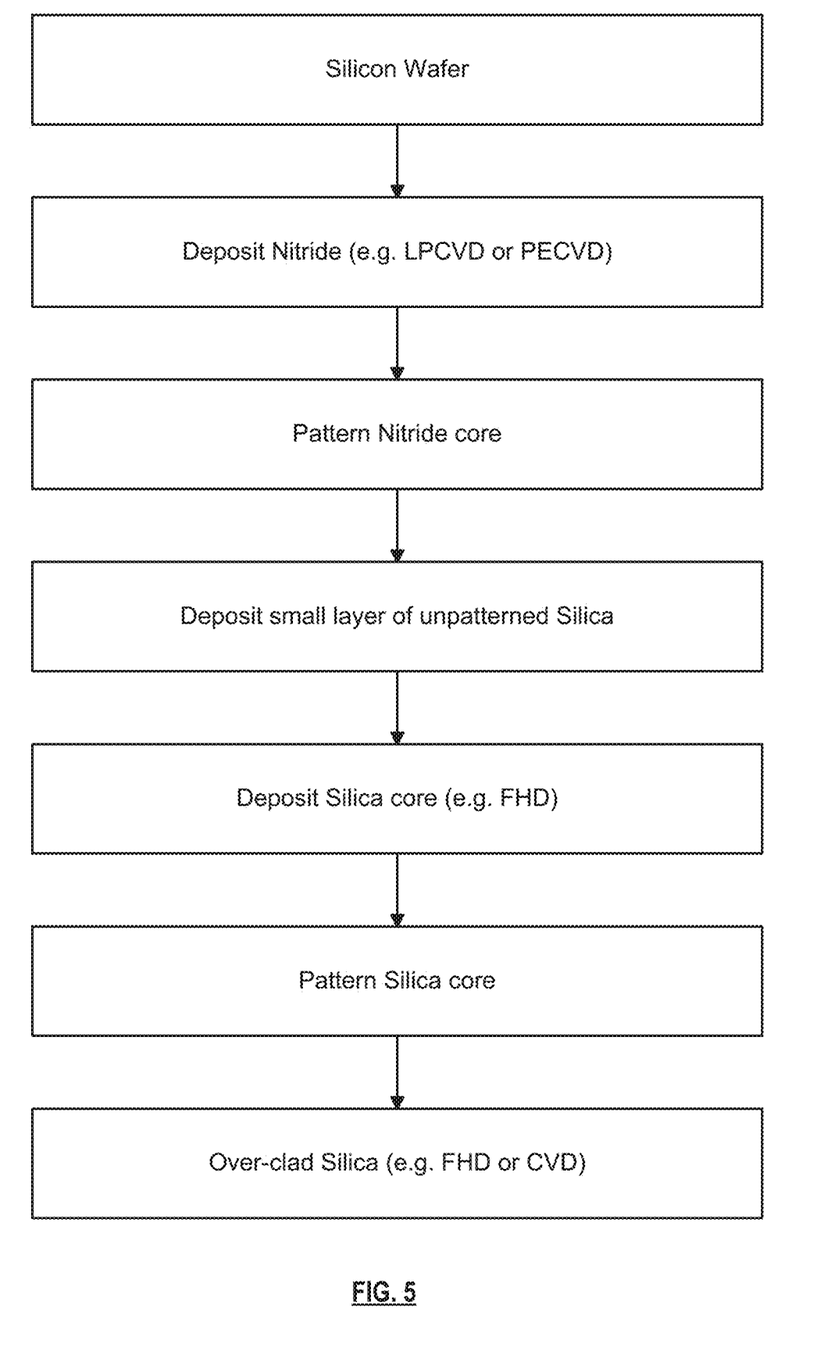
FIG. 5 illustrates major steps of another embodiment of a process for fabricating a device using aspects of the invention.

FIG. 4 illustrates major steps of one embodiment of a process for fabricating a device using aspects of the invention. FIG. 5 illustrates major steps of another embodiment of a process for fabricating a device using aspects of the invention.

Figure 6:
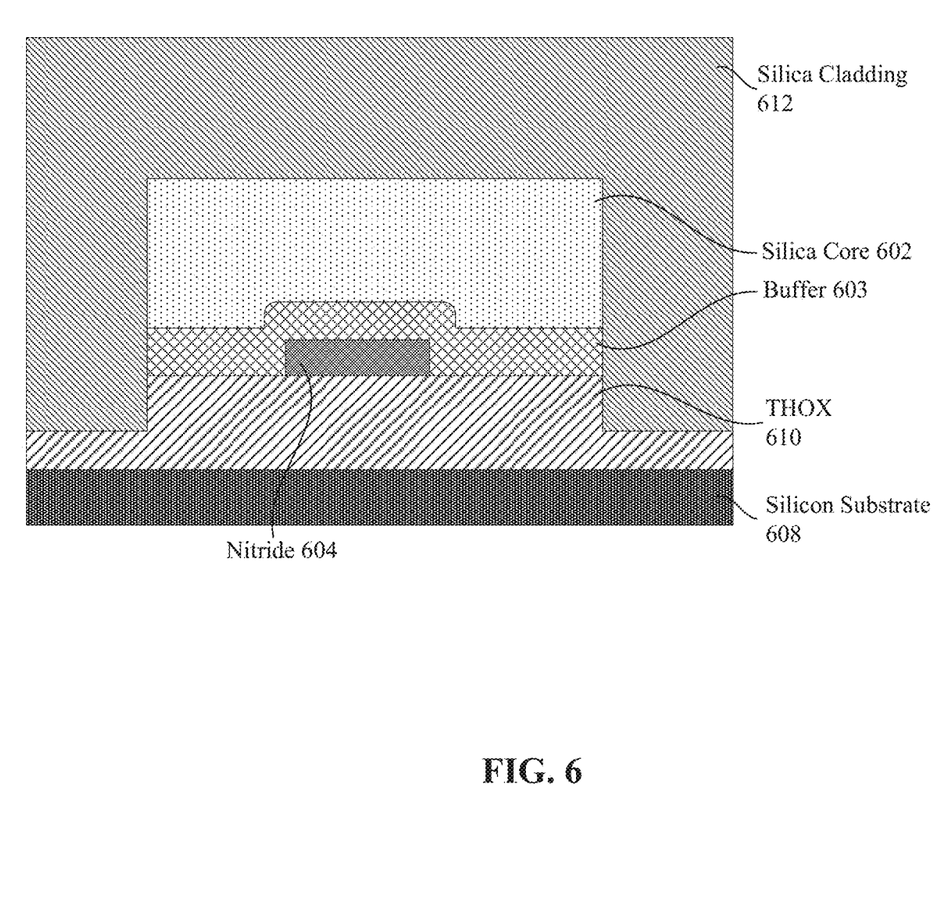
FIG. 6 is a cross-sectional view of an embodiment of a transition structure according to aspects of the invention.

FIG. 6 is a cross-sectional view of an embodiment of a transition structure according to aspects of the invention, taken in the region where the two waveguides overlap. In FIG. 6, the nitride core material is identified as 604, the silica core material is identified as 602, and the silica cladding material is identified as 612. A thin silica buffer layer 603 overlies the thermal oxide layer 610 and encases the nitride core material 604. The buffer layer 603 is used to help protect the nitride layer as it acts as a protective capping layer to help reduce loss. The silica core material 602 is still considered to "sheath" the nitride core material 604, as that term is used herein. In an embodiment, the width of the silica waveguide 602 may be on the order of 4 microns, the nitride layer 602 may have a thickness on the order of 200 nm, the buffer layer 603 may have a thickness on the order of 600 nm, the nitride 604 may have a refractive index contrast of more than 5%, and the silica core material 602 may have a refractive index contrast of 0.3% to 5%. In one configuration, the silica core refractive index may be on the order of 1.45 to 1.47, the silica cladding refractive index may be on the order of 1.445, and the nitride refractive index may be on the order of 1.98.

Figure 7:
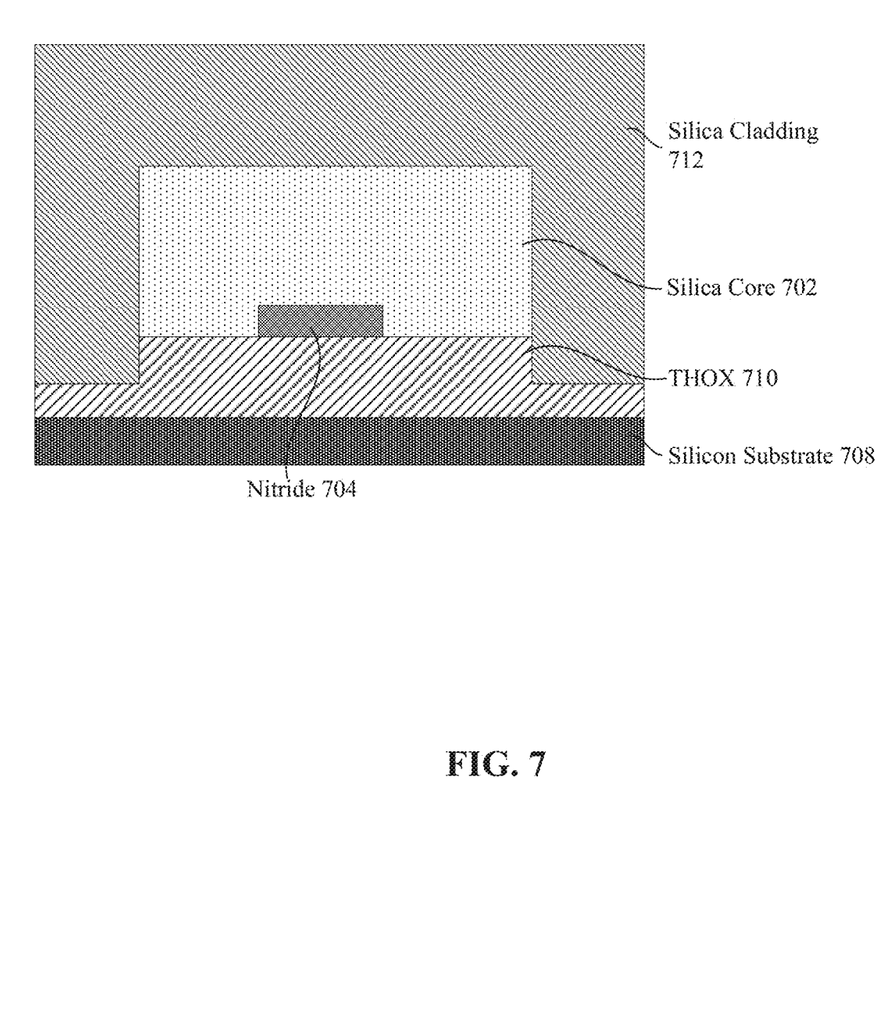
FIG. 7 is a cross-sectional view of another embodiment of a transition structure according to aspects of the invention.

FIG. 7 is a cross-sectional view of another embodiment of a transition structure according to aspects of the invention, taken in the region where the two waveguides overlap. In FIG. 7, the nitride core material is identified as 704, the silica core material is identified as 702, and the silica cladding material is identified as 712. Unlike FIG. 6, in the FIG. 7 embodiment there is no thin buffer layer separating the nitride core material from the silica core material.

Figure 8:
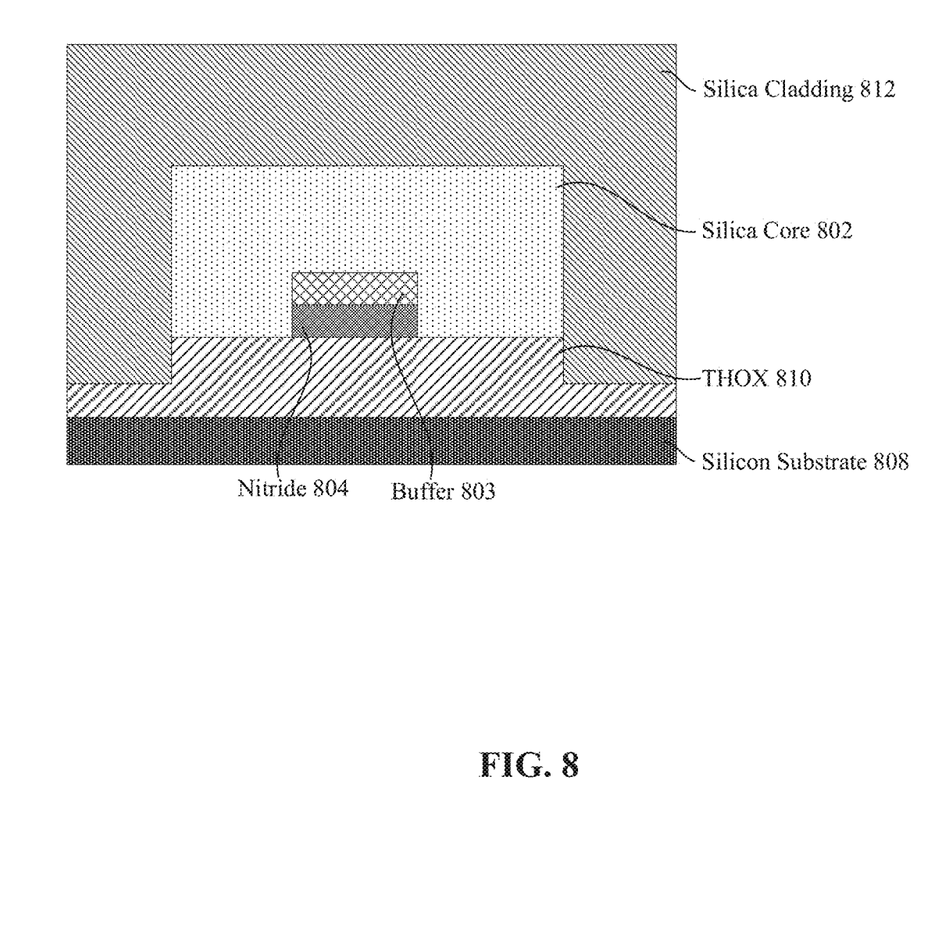
FIG. 8 is a cross-sectional view of another embodiment of a transition structure according to aspects of the invention.

FIG. 8 is a cross-sectional view of another embodiment of a transition structure according to aspects of the invention, taken in the region where the two waveguides overlap. In FIG. 8, the nitride core material is identified as 804, the silica core material is identified as 802, and the silica cladding material is identified as 812. A thin buffer layer 803 overlies only the nitride core material 804, and not the thermal oxide layer 810. It is formed over the thermal oxide layer 810 and the nitride core material 804 layer and then patterned together with the nitride core material. The silica core material is still considered to "sheath" the nitride core material, as that term is used herein.

It can be seen that the techniques discussed herein allow a high percentage power coupling between the die and fiber. This reduces optical coupling losses between the fiber, the silica waveguides and the nitride waveguides. The techniques also save energy, and enable the use of a hybrid technology platform that switches between silica and nitride based waveguides, thus enabling a design to benefit from the best of both technologies, e.g. low loss between the fiber and chip for the silica part, and smaller footprint of the chip for the nitride part, especially when compared to a solely silica or a solely nitride equivalent die. This structure works for both polarizations, vertical and horizontal. Another advantage is that the techniques described herein can use a CMOS compatible fabrication process, which means they can make use of the vast technology efforts poured into the CMOS and electronics industry.

In certain embodiments, the index contrast between the core and cladding of the silica waveguides can be, for example, any contrast between about 0.3% to about 5%. A contrast of 1.5% is reasonable.

Note that whereas the two waveguide technology platforms mentioned herein are silica and a nitride compound, it will be appreciated that the same concepts can also be applied in other material pairs as well.

The descriptions herein assume Helmholtz reciprocity, which is the principle that a ray of light and its reverse ray encounter matched optical adventures, such as reflections, refractions, mode conversions, coupling, and absorptions in a passive medium, or at an interface. Thus any description herein of optical structure in terms of how light behaves when traveling in one direction, by its nature also establishes how light behaves when light is traveling in the opposite direction. Such a description does not imply that light must be traveling in the described direction in order to satisfy the description; so long as light would behave as described if it were traveling in the described direction, the device satisfies the description.

Also, note that as used herein, no distinction is intended between substances of an optical structure which are disposed in a substrate, or on a substrate, or partially in and partially on a substrate. For example, all of the features of a waveguide, including core material, cladding material, and so on, are all described equivalently herein as being either "on" the substrate or "in" the substrate, and no distinction is intended between the two words. Still further, as used herein the term "light" refers to any optical energy. It is not limited to visible light.

As used herein, the core and cladding of a waveguide are considered to be made of the same "material", even though the refractive index difference might be introduced by way of doping.

As used herein, the "longitudinal" dimension of a waveguide is the dimension that is much longer than the other two dimensions. The "transverse" direction of the waveguide is the direction cross-wise to the longitudinal dimension but parallel to the substrate. The longitudinal and transverse directions are both considered herein to be "horizontal" dimensions, and are parallel to a major surface of the substrate. The "vertical" dimension of a waveguide is considered herein to be orthogonal to the horizontal dimensions.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features.

In particular and without limitation, though many of the inventive aspects are described individually herein, it will be appreciated that many can be combined or used together with each other. All such combinations are intended to be included in the scope of this document.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated.

The invention claimed is:

1. An optical coupling device, comprising:
   an first optical waveguide having a first core of a first core material sheathed by a first cladding and having a longitudinally terminal portion terminating at an end of the first optical waveguide; and
   a second optical waveguide having a second core of a second core material, the second optical waveguide having a longitudinally terminal portion of the second core and terminating at an end of the second core,
   wherein the longitudinally terminal portion of second core is disposed under the longitudinally terminal portion of the first core and sheathed by the first core, an index of a waveguide mode of the second core being higher than an index of a waveguide mode of the first core, the index of the waveguide mode of the first optical waveguide being higher than that of the first cladding,
   wherein the second core is structured under the longitudinally terminal portion of the first core so that light traveling in the second core and directed toward the end of the second core is guided along the second core and coupled into the first core,
   wherein the terminal portion of the second core is at least partially segmented longitudinally, the segmentation being arranged to decrease an effective index of refraction of the second core monotonically from the end of the first waveguide toward the end of the second core, and
   wherein each segment of the second core material is spaced from the next segment of the second core material by a longitudinal gap of a gap material having an index of refraction lower than that of the second core material, and at least one of:
     the segments decreasing in length monotonically from the end of the first optical waveguide toward the end of the second core, and
     the gaps increasing in length monotonically from the end of the first optical waveguide toward the end of the second core.

2. The device of claim 1, further comprising a silica buffer layer between the second core and the first core.

3. The device of claim 1, wherein the second optical waveguide has a second longitudinal portion longitudinally adjacent to the end of the first optical waveguide, wherein the second longitudinal portion of the second optical waveguide is sheathed by a second cladding having an index of refraction which is less than that of the second core.

4. The device of claim 1, further comprising a substrate, wherein the first and second optical waveguides are integrated onto the substrate.

5. The device of claim 1, wherein the terminal portion of the second core tapers from the end of the first optical waveguide toward the end of the second core.

6. The device of claim 1, wherein the terminal portion of the second core tapers adiabatically from the end of the first optical waveguide toward the end of the second core.

7. The device of claim 1, wherein the gap material is the first core material.

8. The device of claim 1, wherein the gap material comprises a mixture of the first core material and the first cladding material.

9. The device of claim 1, wherein the gaps increase in length monotonically from the end of the first waveguide toward the end of the second core.

10. The device of claim 1, wherein the first optical waveguide is made from silica and the second optical waveguide is made from a silicon nitride compound.

11. The device of claim 1, wherein the first optical waveguide is made from silica and the second optical waveguide is made from silicon oxy-nitride.

12. The device of claim 1, wherein the second optical waveguide has a second longitudinal portion in which the second core is sheathed by a second cladding having an index of refraction which is less than that of the second core, wherein the first optical waveguide having the first core and the first cladding has a first minimum bend radius for single mode optical transmission, wherein the second optical waveguide having the second core and the second cladding has a second minimum bend radius for single mode optical transmission, and wherein the second minimum bend radius is less than the first minimum bend radius.

13. The device of claim 12, wherein the second minimum bend radius is no more than 100 microns.

14. The device of claim 1, wherein the first optical waveguide is coupled to transfer optical energy into or from an optical fiber.

15. The device of claim 14, wherein the second waveguide is coupled to transfer optical energy into or from an active optical device.

16. The device of claim 1, wherein the second optical waveguide is coupled to transfer optical energy into or from an active optical device.

17. The device of claim 1, wherein the second optical waveguide extend through the end of the first optical waveguide.

18. The device of claim 1, wherein each of the segments has same width and thickness.

* * * * *